(12) United States Patent
Killick et al.

(10) Patent No.: US 9,169,165 B2
(45) Date of Patent: Oct. 27, 2015

(54) FOLIAR NUTRIENT COMPOSITIONS

(75) Inventors: Robert William Killick, Mount Waverley (AU); Andrew Robert Killick, Richmond (AU); Peter William Jones, Menzies Creek (AU); John David Morrison, Thomastown (AU)

(73) Assignee: Innovative Chemical Services Pty Ltd, Coolaroo (AU)

( * ) Notice: Subject to any disclaimer, the term of this patent is extended or adjusted under 35 U.S.C. 154(b) by 602 days.

(21) Appl. No.: 13/580,699

(22) PCT Filed: Feb. 23, 2011

(86) PCT No.: PCT/AU2011/000185
§ 371 (c)(1),
(2), (4) Date: Aug. 23, 2012

(87) PCT Pub. No.: WO2011/103617
PCT Pub. Date: Sep. 1, 2011

(65) Prior Publication Data
US 2012/0312059 A1  Dec. 13, 2012

(30) Foreign Application Priority Data
Feb. 23, 2010  (AU) ................ 2010900738

(51) Int. Cl.
C05D 9/02     (2006.01)
C05G 3/00     (2006.01)
C05G 3/06     (2006.01)

(52) U.S. Cl.
CPC  *C05G 3/007* (2013.01); *C05D 9/02* (2013.01); *C05G 3/0064* (2013.01); *C05G 3/06* (2013.01)

(58) Field of Classification Search
None
See application file for complete search history.

(56) References Cited

U.S. PATENT DOCUMENTS

| 3,345,154 | A | * | 10/1967 | Allison et al. ............... 71/42 |
| 3,708,275 | A | * | 1/1973 | Camp, Jr. .................... 71/1 |
| 3,982,920 | A | * | 9/1976 | Cross et al. ................. 71/1 |
| 5,906,961 | A | * | 5/1999 | Roberts et al. ........... 504/365 |
| 6,241,795 | B1 | * | 6/2001 | Svec et al. ................. 71/11 |
| 7,445,657 | B2 | * | 11/2008 | Green ........................ 71/31 |
| 7,452,399 | B2 | * | 11/2008 | Whittington ............... 71/63 |
| 2007/0078057 | A1 | | 4/2007 | Rowley et al. |
| 2007/0197394 | A1 | * | 8/2007 | Policello et al. ......... 504/358 |
| 2009/0308122 | A1 | * | 12/2009 | Shah ........................... 71/27 |

FOREIGN PATENT DOCUMENTS

| WO | 9400009     | 1/1994  |
| WO | 9909831     | 3/1999  |
| WO | 0115536     | 3/2001  |
| WO | 02080673    | 10/2002 |
| WO | 2006065397  | 6/2006  |
| WO | 2008127661  | 10/2008 |

OTHER PUBLICATIONS

Scotts Material Safety Data Sheet Miracle-Gro [Retrieved on Apr. 8, 1022]. Retrieved from Internet: <URL:http://replay.waybackmachine.org/20090912203022/http://www.scottsaustralia.com/au/images/MSDS/Miracle_Gro_All_Purpose_Water_Soluble_Plant_Food.pdf> published Sep. 12, 2009 as per Wayback Engine.

* cited by examiner

*Primary Examiner* — Wayne Langel
(74) *Attorney, Agent, or Firm* — Hahn, Loeser & Parks, LLP; Lorraine Hernandez

(57) ABSTRACT

A liquid foliar nutrient composition comprising oil, essential element(s) and optionally, a surfactant to enable a stable useable dispersion of the oil and the essential element(s) to be formed.

15 Claims, No Drawings

FOLIAR NUTRIENT COMPOSITIONS

CROSS-REFERENCE TO RELATED APPLICATIONS

This application is a national stage of International Application No. PCT/AU2011/000185, filed Feb. 23, 2011, and claims priority to Australian Application No. 2010 900738 filed Feb. 23, 2010.

FIELD OF THE INVENTION

The invention relates to a liquid composition comprising one or more elements for plant nutrition (essential elements) and an oil.

BACKGROUND OF THE INVENTION

In this specification where a document, act or item of knowledge is referred to or discussed, this reference or discussion is not an admission that the document, act or item of knowledge or any combination thereof was at the priority date publicly available, known to the public, part of the common general knowledge or known to be relevant to an attempt to solve any problem with which this specification is concerned.

It is a common and well-established practice to supplement crops with the major elements of plant nutrition C, H, O, N, P, K and S (also referred to as macronutrients). These major elements are available in many different forms, are used in almost every crop type and are commonly used in large quantities. The major elements are most commonly applied as solid forms (eg. granules, crystalline, pellets) to the soil prior to planting but there are liquid or soluble forms available which may be sprayed as a water solution. When applying solutions of these major elements foliarly to a crop, they may be used in conjunction with additives, such as wetting agents and oils, to enhance the efficacy of their application to a crop. For example, WO2008127661 describes the preparation of liquid fertiliser formulations of N, P, K and S containing oil using surfactants to combine the ingredients.

It has become a more common farming practice to apply certain essential elements (also referred to as micronutrients) directly to a crop during growth to counter a deficiency in the soil and/or to promote beneficial effects such as fortifying the produce. Crops are monitored and when a deficiency is evident, then particular foliar nutrient(s) can be applied to quickly correct it. Such foliar nutrients are nearly always applied by spraying an aqueous solution of the nutrient directly to the crop. This is an efficient method of managing nutrients as foliar nutrients tend to be taken up more quickly after application compared with pre-plant soil nutrition which generally requires the application of a large excess of the nutrients to be available in the soil for long periods. These essential elements are generally required in a much smaller quantity than the major elements (macronutrients above) and are typically much more expensive per unit. They may also have discreet functions within particular crops and hence may only be required at certain stages of the crop cycle. So the use of foliar sprays of micronutrients, as and when required is becoming more common practice.

Additives, such as wetting agents, may be included in the foliar nutrient product formulation or added separately to the spray tank to enhance the efficacy of their application to a crop.

Oil-based additives are commonly used with many agrichemicals (also known as agrochemicals) including herbicides, insecticides, defoliants, fungicides and growth regulators as well as with some macronutrients (see prior art example above). The function of oil-based additives when used with agrichemicals is mostly to assist in foliar penetration of the agrichemical where a solution of the agrichemical in the oil penetrates the waxy surface of the foliage. As a result, oil soluble agrichemicals generally benefit the most from the addition of oil-based additives. Such oil-based additives may be formulated with the agrichemical or added to the tank mix as a separate product. Oil-based additives are rarely, if ever, used with foliar nutrient products as the essential elements are generally available in a water soluble form and thus would not be expected to be soluble in lipophilic materials. Consequently, combinations of oils with essential elements applied foliarly is not expected to provide any significant benefit.

SUMMARY OF THE INVENTION

It has surprisingly been found that foliar nutrient formulations containing certain essential elements and an oil can increase the uptake of those essential elements by the crop after foliar application.

According to a first aspect of the invention, there is provided a liquid foliar nutrient composition comprising:
(i) an amount in the range of from 5 to 80% by weight of an oil selected from the group consisting of mineral oils, vegetable oils, esters of fatty acids, aliphatic alcohols and mixtures thereof; and
(ii) an amount up to 80% by weight of an essential element selected from the group consisting of Fe, Mn, B, Cu, Mo, Co, Ni, Zn, Ca, Mg, Si, Se and mixtures thereof. In a preferred embodiment, the liquid foliar nutrient composition further comprises:
(iii) up to 30% on a dry weight active basis of a surfactant to enable a stable useable dispersion of the oil and the essential element(s) to be formed, the surfactant selected from the group consisting of polymeric, nonionic, cationic, amphoteric and anionic surfactants and mixtures thereof.

The oil must be liquid and crop safe. Preferred mineral oils have a carbon number in the range of 12 to 30, are low in aromatic compounds and have a viscosity (at 40° C.) in the range of approximately 5 to 50 cSt. Suitable vegetable oils include all liquid vegetable oils. Preferably, the vegetable oils are refined so as to remove gums and excess acidity to ensure that the liquid emulsion composition is stable, liquid and sprayable. Preferably, the amount of oil used in the composition is in the range of from 5 to 50% w/w, more preferably 5 to 30% w/w, and most preferably 5 to 20% w/w.

Suitable esters of fatty acids include alkyl esters of fatty acids wherein:
the alkyl moiety may be methyl, ethyl, propyl or butyl; and
the fatty acids are from any natural or synthetic source, are saturated and/or unsaturated and the majority of the fatty acids have a carbon number of from 12 to 22.

A typical embodiment are methyl esters of canola oil, where the major component is methyl oleate.

Where an aliphatic alcohol is the oil of choice, it may be selected from primary or secondary alcohols having a carbon number of from 8 to 22 and may be saturated or unsaturated. A typical embodiment is a C-12 Guerbet alcohol.

The essential element of the foliar nutrient composition is selected from the group consisting of Fe, Mn, B, Cu, Mo, Co, Ni, Zn, Ca, Mg, Si, Se and mixtures thereof. The preferred essential elements are the transition metals and alkaline earth metals, namely Fe, Mn, Cu, Mo, Co, Ni, Zn, Ca, Mg and mixtures thereof. The most preferred essential elements are the transition metal elements, namely Fe, Mn, Cu, Mo, Co, Ni, Zn and mixtures thereof.

These essential elements are generally available as water-soluble forms, such as water soluble salts, chelates or complexes. The essential elements may have differing states of hydration/solvation and/or exist as different polymorphs. For example, zinc could be incorporated into a formulation according to the invention as zinc chloride or zinc sulphate (water-soluble salts). Other examples of suitable essential elements include manganese chloride tetrahydrate, magnesium chloride, calcium chloride, boric acid, and boric acid-diethanolamine adduct.

When formulating with water soluble salts of essential elements, those with high solubility are preferred such as the chlorides, nitrates, sulphates or carbonates. Other issues, such as incompatibility between different ingredients, redox reactions and formation of insoluble salts, need to be taken into account when preparing compositions according to the invention, particularly when formulating with more than one essential element.

The essential elements may also be present in an oil soluble form such as an oil soluble salt or chelate. Examples of an oil soluble salts are zinc 2-ethylhexanoate and copper abietate.

The amount of essential element used in the composition will depend on the particular essential element(s) used and on the particular form of the essential element. There are different ways of reporting the quantity of essential elements in foliar nutrient products. Some systems report w/v and others w/w, either as the element or as a common salt form of the element (eg 200 g/l Zn calculated as ZnO). In this patent specification, the amount of essential element in the compositions according to the invention is % w/w calculated as the element. The compositions in Table 1 of Example 1 show the proportion of ingredients input so a calculation is required to determine the amount of essential element in each composition. For example, a greater weight of the boric acid-diethanolamine adduct would be used than if boric acid is used to provide an equivalent amount of the essential element boron. Preferably, the amount of essential elements used in the composition is in the range of from 0.5 to 50% w/w, more preferably 1 to 50% w/w, and most preferably 2 to 30% w/w.

In certain embodiments, where the essential element is in an oil-soluble form, then the essential element can simply be dissolved into the oil to form an oil solution.

In certain embodiments, where the essential element is in a water-soluble form, then an emulsion of an aqueous solution of the essential element(s) and oil is prepared using a surfactant. The emulsion may be of any form including a microemulsion or a coarse emulsion depending on the particular salt or chelate and the surfactant used.

In certain embodiments, where more than one essential element is used and at least one essential element is in an oil-soluble form and at least one essential element is in a water-soluble form, then the formulation according to the invention may be an emulsion comprising the oil-soluble essential element in the oil phase and the water soluble essential element in the water phase.

In the embodiments, where a surfactant is used to prepare an emulsion, the surfactant's role will be multi-faceted. It will enable the oil and essential elements to form a homogeneous liquid. It will also allow the formulation to be dispersible into water for spray application and may help the spray application to adhere to and spread across foliar surfaces and to promote foliar uptake.

In the embodiments where an oil-soluble essential element is dissolved in oil, it may be desired to also add a surfactant to act as a dispersing agent and potentially help the spray application to adhere to and spread across foliar surfaces and to promote foliar uptake.

Preferably, the amount of surfactant used in the composition is in the range of from 0.1 to 30% w/w, more preferably 0.1 to 20% w/w, and most preferably 1 to 18% w/w.

Suitable surfactants can be selected from the group consisting of:

- nonionic surfactants such as alcohol alkoxylates, alkylamine oxides, fatty acid ethoxylates, fatty acid glycerides, sorbates, polysorbates, and alkyl polyglucosides,
- anionic surfactants such as calcium dodecylbenzene sulphonate, sulphated or phosphated fatty alcohols/fatty alcohol polyethers, fatty acid salts, alkyl polyether carboxylates and their salts,
- polymeric surfactants such as high molecular weight polymeric surfactants having a molecular weight in the range 2000 to 12000,
- amphoteric surfactants such as betaines,
- cationic surfactants such as alkylquaternary amines, and mixtures thereof.

Examples of suitable high molecular weight polymeric surfactants having a molecular weight in the range 2000 to 12000, which are typically linear, include:

- Polyalkylene oxide block copolymers (namely ethylene oxide-propylene oxide block copolymers of butanol) such as Atlas™ G-5000, Termul™ 5429 or Tergitol™ XJ, XD or XH;
- Polyisobutene succinic anhydride—polyethylene glycol such as Atlox™ 4914;
- Polyhydroxystearate polyethers such as Atlox™ 4912, or
- Polyalkylene oxide triblock copolymers of the type EO/PO/EO (where EO is ethylene oxide and PO is propylene oxide) such as Synperonic™ PE/F 127 and Poloxomer™ 338.

Some surfactants may be responsible for undesirable side-effects when applying foliar nutrients to certain crops. For example, some surfactants may increase the risk of crop phytotoxicity, foaming, driftable fines and toxicity to non-target organisms such as insects and aquatic life and as such there may be a need for foliar nutrient products containing low levels of total surfactants.

In certain embodiments, it is preferable for the liquid foliar nutrient composition to contain a low level of surfactant. For example, such liquid foliar nutrient compositions may comprise an amount in the range of from 0.1 to 5% w/w of at least one of the high molecular weight polymeric surfactants having a molecular weight in the range 2000 to 12000. The composition may contain other surfactants to assist with application of the composition. Preferably, the ratio of total surfactants (both the high molecular weight polymeric surfactants and the surfactants to assist with application) in the composition to oil is less than 1:3, more preferably less than 1:4, and most preferably less than 1:6. In a particularly preferred embodiment, the liquid foliar nutrient compositions contain no more than 6% w/w total surfactant, more preferably less than 5% w/w.

Preferably, the composition may include other additives such as acidifiers and coupling agents which may be desirable to help the form of the composition. Examples of acidifiers include lactic acid, propionic acid and citric acid. Examples of suitable coupling agents include alcohols, amines, alkylcarbonates, glycols and glycol ethers such as glycerine, dipropylene glycol, urea, ammonium acetate, aqueous ammonia and dipropylene glycol monomethyl ether.

Compositions according to the invention may comprise components which provide some of the major elements normally provided to such plants. Whilst these major elements are not the focus of this invention, one or more of them may be present in compositions according to the invention, either deliberately or as a natural consequence of the choice of ingredients. For example, the urea, nitrogen containing surfactants and ammonium acetate coupling agents will also provide some nitrogen supplementation. Other major elements which may be included are phosphorous, potassium and sulphur. For example, if the essential element is provided as a sulphate or phosphate salt then the plant will also receive some sulphur or phosphorous. Nitrogen supplementation can also be achieved by adding amino acid solution to the composition.

Compositions according to the invention increase the uptake of the essential elements by the crop after foliar application. Further, the increase obtained by specifically formulating the essential elements with oil in a composition according to the invention is significantly more than that obtained by simply adding individual oil-based adjuvants to the tank mix.

According to a second aspect of the invention, there is provided a method for increasing the foliar uptake by a crop of essential elements, the method comprising the steps of:
(a) preparing a liquid foliar nutrient composition comprising:
  (i) an amount in the range of from 5 to 80% by weight (preferably 5-50%) of an oil selected from the group consisting of mineral oils, vegetable oils, esters of fatty acids, aliphatic alcohols and mixtures thereof; and
  (ii) an amount up to 80% by weight of an essential element selected from the group consisting of Fe, Mn, B, Cu, Mo, Co, Ni, Zn, Ca, Mg, Si, Se and mixtures thereof; and
(b) administering the composition to the crop.

In a preferred embodiment, the liquid foliar nutrient composition in step (a) further comprises:
  (iii) up to 30% on a dry weight active basis of a surfactant to enable a stable useable dispersion of the oil and the essential element(s) to be formed, the surfactant selected from the group consisting of polymeric, nonionic, cationic, amphoteric and anionic surfactants and mixtures thereof.

As per current common practice, the method may further comprise adding organic matter or combinations of N, P, K or S to the crop.

EXAMPLES

Various embodiments/aspects of the invention will now be described with reference to the following non-limiting examples.

Example 1

In this example, various formulations according to the invention were prepared.

Table 1 shows a range of formulations prepared according to the invention. All the formulations presented in Table 1 are stable homogeneous liquids which can be easily dispersed into water for spray application.

Formulations A, B, C, D, H, I, J and K are micro-emulsion formulations where an aqueous solution containing essential element(s) in salt form is emulsified with an oil using surfactants.

Formulation G is a stable coarse emulsion prepared using polymeric surfactants with a ratio of total surfactants to oil of 4:15.

Formulations E and F are oil solutions where the zinc has been dissolved in the oil as an oil-soluble salt.

Formulation L is an emulsion product where the essential element copper is provided as an oil soluble salt in the oil phase and the essential element magnesium is provided as a water soluble salt in the aqueous phase. Formulation L was prepared using polymeric surfactants with a ratio of total surfactants to oil of 3:28.

Formulation I contains a boric acid-diethanolamine adduct containing approximately 15.4% w/w B which was prepared by reacting 3 moles of boric acid with one mole of diethanolamine (CAS No. 68954-07-4).

TABLE 1

| Component | Function | A | B | C | D | E | F | G | H | I | J | K | L |
|---|---|---|---|---|---|---|---|---|---|---|---|---|---|
| Water | Solvent | 24.5 | 28.6 | 22.9 | 33.8 | — | — | 60.0 | 35.0 | 21.3 | 19.0 | 12.5 | 33.0 |
| Zinc Chloride | Nutrient | 7.8 | 42.9 | — | 40.5 | — | — | 21.0 | — | — | — | 8.3 | — |
| Zinc 2-Ethylhexanoate | Nutrient | — | — | — | — | 49.0 | 25 | — | — | — | — | — | — |
| Manganese Chloride tetrahydrate | Nutrient | 10.1 | — | 30.2 | — | — | — | — | — | — | — | — | — |
| Magnesium Chloride, anhydrous | Nutrient | — | — | — | — | — | — | — | 19.5 | — | — | — | 16.0 |
| Copper Abietate | Nutrient | — | — | — | — | — | — | — | — | — | — | — | 20.0 |
| Boric acid | Nutrient | 0.5 | — | — | — | — | — | — | — | — | — | — | — |
| Boric Acid—Diethanolamine adduct* | Nutrient | — | — | — | — | — | — | — | — | 41.0 | — | — | — |
| Calcium Chloride, anhydrous | Nutrient | — | — | — | — | — | — | — | — | — | 13.3 | — | — |
| Amino acid solution 60% | Nitrogen based nutrient | — | — | — | — | — | — | — | — | — | — | 41.6 | — |
| Esterol 112—methyl ester of fatty acids | Oil | 13.8 | 7.2 | 12.3 | 6.8 | 43.8 | 75 | 15.0 | 14.9 | 11.5 | 23.7 | 16.7 | 28.0 |
| Lactic acid 88% | Acidifier | 2.6 | — | — | — | — | — | 0.5 | — | 1.7 | — | — | — |

TABLE 1-continued

| Component | Function | A | B | C | D | E | F | G | H | I | J | K | L |
|---|---|---|---|---|---|---|---|---|---|---|---|---|---|
| Propionic acid | Acidifier | — | — | 1.4 | — | — | — | — | — | — | — | — | — |
| Citric acid | Acidifier | — | — | — | — | — | — | — | 0.5 | — | — | — | — |
| Alkadet 15 | Surfactant | 8.7 | 8.2 | 13.4 | 6.8 | — | — | — | 9.4 | 15.5 | 11.4 | 8.3 | — |
| Vicamox 401 | Surfactant | 8.7 | 10.2 | 8.2 | — | — | — | — | 9.9 | 3.3 | 11.4 | — | — |
| Teric DD5 | Surfactant | 6.1 | 1.9 | 2.3 | 2.2 | — | — | — | 2.5 | 4.8 | 10.1 | — | — |
| Vicamid 825 | Surfactant | — | — | 5.2 | 1.1 | — | — | — | 4.8 | — | — | 4.2 | — |
| Unisol 862S | Surfactant | — | — | — | 7.4 | — | — | — | — | — | — | — | — |
| Esterol 244 | Surfactant | — | — | — | — | 7.2 | — | — | — | — | — | — | — |
| Esterol 263 | Surfactant | — | — | — | — | — | — | 3.0 | — | — | — | — | — |
| Teric 12A3 | Surfactant | — | — | — | — | — | — | — | — | — | — | 4.2 | — |
| Teric 16A22 | Surfactant | — | — | — | — | — | — | — | — | — | — | — | 2.0– |
| Atlas G-5000 | Surfactant | — | — | — | — | — | — | 1.0 | — | — | — | — | 1.0 |
| Dipropylene Glycol | Coupling agent | 2.4 | 1.0 | — | 1.5 | — | — | — | — | 1.6 | — | — | — |
| Urea | Coupling agent | — | — | — | — | — | — | — | — | — | 4.7 | — | — |
| Ammonium acetate | Coupling agent | 14.8 | — | — | — | — | — | — | — | — | — | — | — |
| Aqueous Ammonia 25% | Coupling agent | — | — | — | — | — | — | — | — | 1.0 | — | 4.2 | — |
| Glysolv DPM | Coupling agent | — | — | 4.1 | — | — | — | — | 3.0 | — | 4.7 | — | — |

Example 2

In this example, formulations according to the invention were tested to determine foliar uptake of zinc into the foliage and grain of a wheat crop.

Methodology and Results

Table 2 shows the treatment list and results for the field experiment. Seven (7) products were compared and each was applied at a low rate (100 g Zn/ha) and high rate (400 g Zn/ha) to a wheat crop in zinc deficient soil at the 3-4 leaf stage (Zn 13-14) using a hand-held boom spray applying 100 l/ha. The results reported are an average of four replicates (plot size 2×20 m). Analysis was of the youngest emerged blade 14 days after treatment for Zn content of the foliage and for zinc content of the grain at harvest.

In the table,
Deluge 1000 is a wetting agent sourced from Victorian Chemical Company Pty Ltd;
Hasten is an oil-based adjuvant sourced from the Victorian Chemical Company Pty Ltd; and
Smartrace Zinc is a nutrient sourced from SprayGro.

Discussion

The results of the field experiment show that the oil-containing formulations according to the invention (Formulations B, D, E & G) when applied at the high rate (400 g Zn/ha) all promoted a greater uptake of zinc than the commercial products. This was exhibited in both the foliage and in the grain.

Treatment 5 consisted of a high application rate of zinc (400 g/ha) with tank mix adjuvants Deluge 1000 (wetting agent) & Hasten (esterified vegetable oil). The individual adjuvants appeared to enhance the uptake of zinc (cf Treatment 3), but not as significantly as the formulations according to the invention where zinc was co-formulated with the oil and surfactants.

TABLE 2

Treatment List and Results- Trial 1

| No. | Description | Rate g Zn/ha | Zn Product (Nutrient) | Zn Content Foliage (mg/kg) | Zn Content Grain (mg/kg) |
|---|---|---|---|---|---|
| 1 | UTC (untreated control) | | None | 16 | 12.75 |
| 2 | Commercial Standard | 100 g/ha | ZnSO$_4$ | 15 | 13.5 |
| 3 | Commercial Standard | 400 g/ha | ZnSO$_4$ | 17.5 | 14.75 |
| 4 | Commercial Standard + Adjuvants | 100 g/ha | ZnSO$_4$ Deluge 1000 Hasten | 15 | 13.25 |
| 5 | Commercial Standard + Adjuvants | 400 g/ha | ZnSO$_4$ Deluge 1000 Hasten | 24 | 15.5 |
| 6 | Formulation B | 100 g/ha | Formulation B | 19 | 14.25 |
| 7 | Formulation B | 400 g/ha | Formulation B | 39 | 20 |
| 8 | Formulation D | 100 g/ha | Formulation D | 18.5 | 13.75 |
| 9 | Formulation D | 400 g/ha | Formulation D | 39.5 | 18.75 |
| 10 | Formulation E | 100 g/ha | Formulation E | 18 | 14.5 |
| 11 | Formulation E | 400 g/ha | Formulation E | 39.5 | 18.25 |
| 12 | Commercial Chelate | 100 g/ha | Smartrace Zinc | 17 | 13.5 |
| 13 | Commercial Chelate | 400 g/ha | Smartrace Zinc | 20 | 14.25 |
| 14 | Formulation G | 100 g/ha | Formulation G | 20.5 | 14 |
| 15 | Formulation G | 400 g/ha | Formulation G | 45 | 20.25 |

Example 3

In this example, formulations according to the invention were tested to determine foliar uptake of zinc into the foliage and grain of a wheat crop (grain analysis not available at time of publishing).

Methodology and Results

All formulations were again applied at low (100 g/ha) and high (400 g/ha) rates of zinc. In this experiment zinc chloride (with and without adjuvants) was also included as a reference, given that it is the form of zinc used in Formulations B & K.

The experimental adjuvants (VCC-19821.24 and VCC-19821.25) included in this experiment were formulations similar to the foliar nutrient compositions according to the invention but without any essential element. In particular, VCC-19821.25 is similar to Formulation B but does not contain any $ZnCl_2$ and VCC-19821.24 is similar to Formulation K also without any $ZnCl_2$.

TABLE 3

Treatment List and Results - Trial 2

| No. | Description | Rate g Zn/ha | Zn Product (Nutrient) | Zn Content Foliage (mg/kg) |
|---|---|---|---|---|
| 1 | UTC (untreated control) | | None | 23.5 |
| 2 | Commercial Standard | 100 g/ha | $ZnSO_4$ | 27.0 |
| 3 | Commercial Standard | 400 g/ha | $ZnSO_4$ | 27.5 |
| 4 | Commercial Standard + Adjuvant | 100 g/ha | $ZnSO_4$ Deluge 1000 | 30.0 |
| 5 | Commercial Standard + Adjuvant | 400 g/ha | $ZnSO_4$ Deluge 1000 | 27.5 |
| 6 | Commercial Standard + Adjuvant | 100 g/ha | $ZnSO_4$ Hasten | 29.5 |
| 7 | Commercial Standard + Adjuvant | 400 g/ha | $ZnSO_4$ Hasten | 33.0 |
| 8 | Commercial Standard + Adjuvant | 100 g/ha | $ZnSO_4$ VCC-19821.25 | 25.5 |
| 9 | Commercial Standard + Adjuvant | 400 g/ha | $ZnSO_4$ VCC-19821.25 | 37.0 |
| 10 | Commercial Standard + Adjuvant | 100 g/ha | $ZnSO_4$ VCC-19821.24 | 26.5 |
| 11 | Commercial Standard + Adjuvant | 400 g/ha | $ZnSO_4$ VCC-19821.24 | 32.5 |
| 12 | Commercial Standard | 100 g/ha | $ZnCl_2$ | 24.4 |
| 13 | Commercial Standard | 400 g/ha | $ZnCl_2$ | 29.5 |
| 14 | Commercial Standard + Adjuvant | 100 g/ha | $ZnCl_2$ VCC-19821.25 | 37.0 |
| 15 | Commercial Standard + Adjuvant | 400 g/ha | $ZnCl_2$ VCC-19821.25 | 40.0 |
| 16 | Commercial Standard + Adjuvant | 100 g/ha | $ZnCl_2$ VCC-19821.24 | 28.5 |
| 17 | Commercial Standard + Adjuvant | 400 g/ha | $ZnCl_2$ VCC-19821.24 | 41.5 |
| 18 | Formulation B | 100 g/ha | Formulation B | 29.0 |
| 19 | Formulation B | 400 g/ha | Formulation B | 55.0 |
| 20 | Formulation K | 100 g/ha | Formulation K | 28.0 |
| 21 | Formulation K | 400 g/ha | Formulation K | 31.5 |

Discussion

The results show that Formulation B (especially at the higher rate of 400 g/ha—Treatment 19) resulted in a greater amount of zinc in the foliage compared with zinc sulphate or zinc chloride with or without the various adjuvants. This experiment also confirmed that enhanced zinc uptake as shown in Example 1 could not be attributed to the salt form of zinc applied as the zinc chloride (with or without adjuvants) did not result in a greater zinc uptake than zinc sulphate.

Example 4

In this example, formulations according to the invention were tested to determine foliar uptake of boron into the foliage and developing fruit.

Methodology and Results

Boron treatments were applied in a manner typical of local practices. Three applications (following bud burst, petal fall and 14 days after petal fall) were made at low (75 g/ha) and high (150 g/ha) rates of boron applied at water volume of 1500 l/ha with four replicates. Fruitlets were sampled and dried 20 days after the last application and analyzed for boron content.

In the table, Bortrac (YARA Bortrac 150) is a commercial boron containing product containing 15% w/v boron supplied by Yara.

TABLE 4

Treatment List and Results - Trial 4

| No. | Description | Rate g B/ha | B Product (Nutrient) | B Content Apple Fruitlet (mg/kg) |
|---|---|---|---|---|
| 1 | UTC (untreated control) | | None | 45.5 |
| 2 | Commercial Standard | 75 g/ha | Bortrac | 52.5 |
| 3 | Commercial Standard | 150 g/ha | Bortrac | 59.5 |
| 4 | Commercial Standard + Adjuvant | 75 g/ha | Bortrac Deluge 1000 | 57.5 |
| 5 | Commercial Standard + Adjuvant | 150 g/ha | Bortrac Deluge 1000 | 61.5 |
| 6 | Commercial Standard + Adjuvant | 75 g/ha | Bortrac Hasten | 59.0 |
| 7 | Commercial Standard + Adjuvant | 150 g/ha | Bortrac Hasten | 67.5 |
| 8 | Commercial Standard + Adjuvant | 75 g/ha | Bortrac VCC-19821.25 | 55.5 |
| 9 | Commercial Standard + Adjuvant | 150 g/ha | Bortrac VCC-19821.25 | 72 |
| 10 | Formulation I | 75 g/ha | Formulation I | 58.5 |
| 11 | Formulation I | 150 g/ha | Formulation I | 75.5 |

Discussion

The results from this experiment show that Formulation I according to the invention generally results in a greater boron content in the fruitlets than the commercial standard, with or without adjuvants, when applied at equivalent rates.

The word 'comprising' and forms of the word 'comprising' as used in this description and in the claims does not limit the invention claimed to exclude any variants or additions.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed:

1. A liquid foliar nutrient composition comprising:
   (i) an amount in the range of from 5 to 80% by weight of an oil selected from the group consisting of mineral oils, vegetable oils, esters of fatty acids, aliphatic alcohols and mixtures thereof; and
   (ii) an amount up to 80% by weight of an essential element selected from the group consisting of Fe, Mn, B, Cu, Mo, Co, Ni, Zn, Ca, Mg, Si, Se and mixtures thereof, wherein the oil and essential element are co-formulated as a stable homogeneous liquid.

2. The composition according to claim 1 further comprising:
  (iii) an amount up to 30% on a dry weight active basis of a surfactant to enable a stable useable dispersion of the oil and the essential element to be formed, the surfactant selected from the group consisting of polymeric, nonionic, cationic, amphoteric and anionic surfactants and mixtures thereof.

3. The composition according to claim 1 wherein the essential element is in an oil-soluble form.

4. The composition according to claim 2 wherein the essential element is in a water soluble form.

5. The composition according to claim 2 wherein the essential element is a mixture of at least one oil-soluble essential element and at least one water-soluble essential element.

6. The composition according to claim 1 wherein the oil is present in an amount in the range of from 5 to 20% w/w.

7. The composition according to claim 1 wherein the essential element is present in an amount in the range of from 0.5 to 50% w/w.

8. The composition according to claim 1 wherein the essential element is present in an amount in the range of from 1 to 50% w/w.

9. The composition according to claim 1 wherein the essential element is present in an amount in the range of from 2 to 30% w/w.

10. The composition according to claim 2 wherein the surfactant is present in an amount in the range of from 0.1 to 30% w/w.

11. The composition according to claim 2 wherein the surfactant is present in an amount in the range of from 0.1 to 20% w/w.

12. The composition according to claim 2 wherein the surfactant is present in an amount in the range of from 1 to 18% w/w.

13. The composition according to claim 1 further comprising additives selected from the group consisting of acidifiers, coupling agents, major elements and mixtures thereof.

14. A method for increasing the foliar uptake by a crop of essential elements, the method comprising the steps of:
  (a) preparing a liquid foliar nutrient composition comprising:
    (i) an amount in the range of from 5 to 80% by weight (preferably 5 50%) of an oil selected from the group consisting of mineral oils, vegetable oils, esters of fatty acids, aliphatic alcohols and mixtures thereof; and
    (ii) an amount up to 80% by weight of an essential element selected from the group consisting of Fe, Mn, B, Cu, Mo, Co, Ni, Zn, Ca, Mg, Si, Se and mixtures thereof,
  wherein the oil and essential element are co-formulated as a stable homogeneous liquid; and
  (b) administering the composition to the crop.

15. The method according to claim 14, wherein the liquid foliar nutrient composition in step (a) further comprises:
  (iii) up to 30% on a dry weight active basis of a surfactant to enable a stable useable dispersion of the oil and the essential element(s) to be formed, the surfactant selected from the group consisting of polymeric, nonionic, cationic, amphoteric and anionic surfactants and mixtures thereof.

* * * * *